United States Patent [19]

Saunders et al.

[11] 4,106,345

[45] Aug. 15, 1978

[54] SIMULATION FACILITY FOR DYNAMICALLY TESTING GUIDANCE SYSTEMS WHICH USE RADIOMETRIC FREQUENCIES

[76] Inventors: Ronald A. Saunders, 27626-145 Pl. SE., Kent, Wash. 98031; Donald A. Willard, 2766 Westlake N., Seattle, Wash. 98101

[21] Appl. No.: 821,607

[22] Filed: Aug. 3, 1977

[51] Int. Cl.² .............................................. G01S 11/00
[52] U.S. Cl. ................................. 73/432 SD; 73/1 R; 343/17.7; 343/100 ME
[58] Field of Search ................... 73/1 R, 1 F, 432 SD; 250/252; 343/100 ME

[56] References Cited

U.S. PATENT DOCUMENTS

| 3,366,960 | 1/1968 | Gluck | 343/100 ME |
| 3,383,902 | 5/1968 | Cragin et al. | 73/1 F |
| 3,955,199 | 5/1976 | Hutzelman | 343/17.7 |
| 3,986,384 | 10/1976 | Giorgi | 73/1 F |

*Primary Examiner*—S. Clement Swisher

[57] ABSTRACT

A simulator chamber has interior walls which have been made reflective by lining them with a very low emissivity material, such as aluminum foil. A portion of the chamber's ceiling is open to the sky and a 45° sloping surface is provided beneath the ceiling opening. A relatively quiet, i.e. cold, environment at radiometric frequencies, i.e. 18 gigahertz–300 gigahertz, within the chamber results. Arranged within the chamber is an array of dynamically controlled noise sources which, when energized, emit energy at radiometric frequencies. The array is capable of simulating the radiometric appearance of particular terrestial scenes, including terrain and selected monuments or objects.

9 Claims, 4 Drawing Figures

FIG. 3
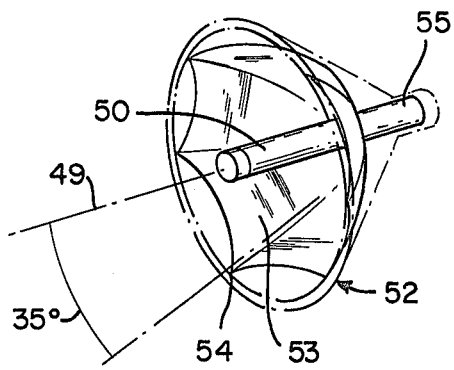
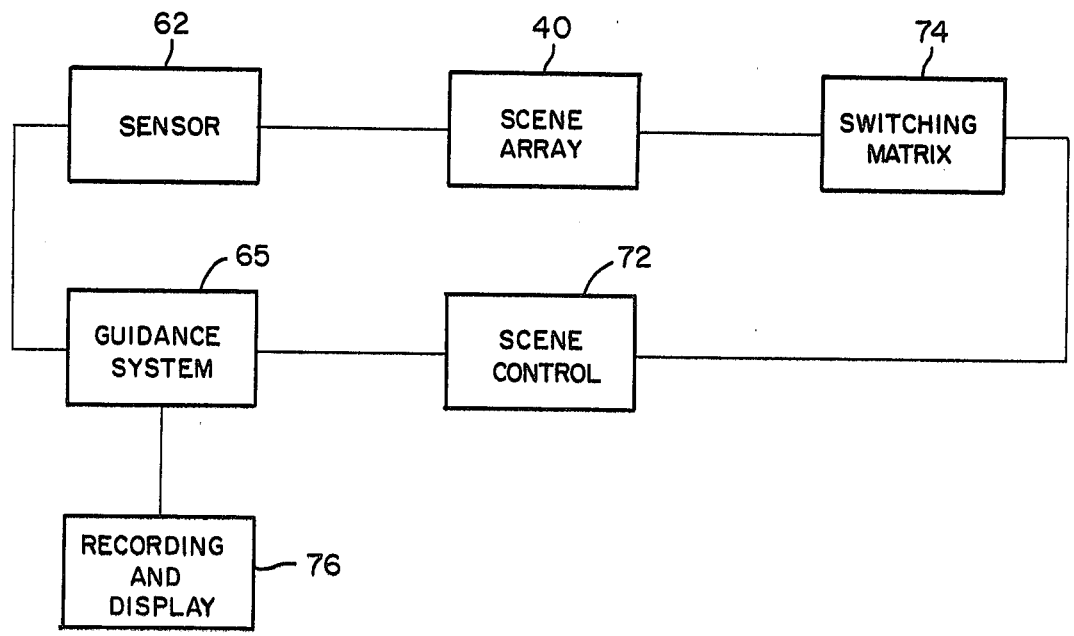
FIG. 4

SIMULATION FACILITY FOR DYNAMICALLY TESTING GUIDANCE SYSTEMS WHICH USE RADIOMETRIC FREQUENCIES

BACKGROUND OF THE INVENTION

The present invention relates generally to the simulator art, and more specifically concerns a simulation facility which provides a proper environment for testing, evaluating, and developing guidance and navigation systems which operate at radiometric frequencies.

The radiometric frequency band, as referred to herein, comprises generally the millimeter and microwave frequency ranges, covering from 18 gigahertz (gHz) to 350 gigahertz (gHz). It has been found desirable in certain applications to use the radiometric frequency band for the guidance and navigation systems on particular aircraft, missiles or other flying objects. For instance, it is known that energy propagated through the air at particular frequencies, namely 35 gHz and 94 gHz is not significantly attenuated by occluded atmospheric conditions such as fog, mist, rain, and smoke, which ordinarily interfere with most conventional guidance and navigation systems. Thus, there are known theoretical advantages to radiometric-frequency guidance systems in certain operating circumstances.

It is also known that, in certain applications, so-called passive guidance/navigation systems are more desirable than a more conventional "active" system. A passive system depends upon the energy emitted by terrain, monuments, objects, etc. for its guidance information, unlike an active system such as radar, which depends upon reflected energy for its guidance information. A passive system generally will present a more stable target for the guidance system to home on, which is important in certain applications.

A system which combines the above-described features, i.e. a passive radiometric guidance system, would appear to offer substantial operational advantages over conventional systems in particular applications. Such innovative guidance systems, however, before being introduced into real-world applications, must be thoroughly tested and evaluated. Due to the expense and unreliability of actual flight tests for operational evaluation of such systems, special-purpose simulators are usually designed and constructed for the testing and evaluation of prototype guidance systems.

The design of a simulator for testing a passive guidance system operating with radiometric frequencies, however, presents numerous technical problems, many of which are not addressed by available simulator technology.

A simulator for testing radiometric guidance systems must be capable of (1) providing a relatively quiet, or cold, background at radiometric frequencies of interest, and (2) accurately and dynamically simulating the real-world emission appearance of a terrestial scene at those same radiometric frequencies. Simulators having this capability were, to the best of the inventors' knowledge, unknown prior to the present invention.

Accordingly, it is a general object of the present invention to provide a simulation facility suitable for evaluation of guidance and navigation systems operating at radiometric frequencies.

It is another object of the present invention to provide such a device which is capable of providing a cold background at radiometric frequencies.

It is a further object of the present invention to provide such a device having the capability of accurately simulating the radiometric emission appearance of a terrestial scene, including terrain, monuments and objects.

It is an additional object of the present invention to provide such a device wherein the simulation of the terrestial scene may be changed dynamically.

It is yet another object of the present invention to provide such a device which can be constructed quickly and is relatively inexpensive.

SUMMARY OF THE INVENTION

Accordingly, the present invention is a simulator which is useful in the dynamic test of a class of guidance systems which use radiometric frequency energy emitted by the components of a terrestial scene, i.e. terrain, monuments, objects, etc., for its guidance information. The simulator includes a chamber, an array of radiometric energy sources, and a low emissity reflecting surface. The chamber is characterized by low-emissivity interior surfaces and includes an opening therein which opens to a heat sink which in turn is capable of receiving radiometric frequency energy from the chamber. These characteristics are important to the invention, since they result in a low background level of radiometric frequency energy in the chamber during simulator operations. A low background level of means sufficiently low so that it does not distort the value of radiometric frequency energy produced by the array. The array is located in the chamber and produces in operation a variable-intensity pattern of radiometric frequency energy. The energy pattern produced by the array simulates the actual pattern of radiometric frequency energy produced by the components of a particular terrestial scene. In the operation of the simulator, the radiometric frequency energy produced by the array is directed toward a sensor which is located in the chamber and which forms a portion of the conventional test apparatus which is used with the simulator to evaluate the performance of a guidance system. The low-emissivity reflecting surface is located in the chamber in such a position that the reflecting surface reflects a substantial portion of the radiometric frequency energy produced by the array which is not otherwise captured by the sensor through said opening and hence out of the chamber.

DESCRIPTION OF THE DRAWINGS

A more thorough understanding of the invention may be obtained by a study of the following detailed description taken in connection with the accompanying drawings in which:

FIG. 3 is a detailed perspective view of one element of the radiometric array of the simulation facility of FIG. 1.

FIG. 4 is a simplified block diagram of the operating components of a complete guidance system flight simulator using the simulation facility of FIG. 1.

DESCRIPTION OF THE PREFERRED EMBODIMENT

The simulation facility, or more simply, simulator, described herein is specifically adapted to dynamically test the performance of passive guidance and navigation systems which use radiometric frequencies for the purpose of their evaluation and development. It includes a (1) simulator chamber which is designed to produce and maintain a background physical environment having a low energy level at radiometric frequencies and (2) an energy array which is capable of dynamically simulating the radiometric emission appearance of a terrestial scene, which is sometimes referred to as the radiometric signature of the scene.

Figure 1:
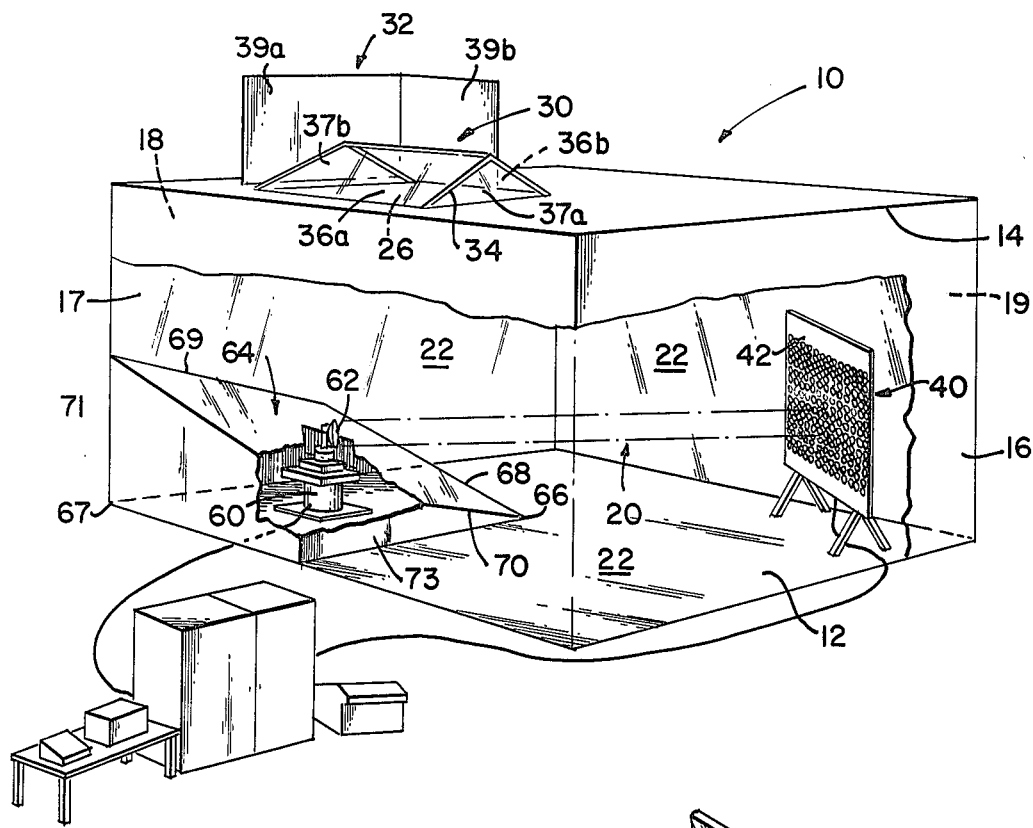
FIG. 1 is a schematic representation of the simulation facility of the present invention.

FIG. 1 shows, in a perspective view, the general configuration of one embodiment, i.e. a prototype, of the simulator of the present invention. The simulator chamber is shown generally at 10, and includes a floor 12, a ceiling 14 and four walls 16, 17, 18 and 19. The general configuration of chamber 10 in the embodiment shown in square, with walls 16–19 being approximately 9 feet high and 15 feet, 8 inches long. Generally it is preferred, but not necessary, that ceiling 14 and floor 12 not be parallel. Chamber 10 may, of course, take other configurations or have other dimensions, depending upon the particular application. Chamber 10 further may be constructed as a separate facility or it may be a part of a larger existing facility.

All of the interior surfaces of chamber 10, including floor 12 and ceiling 14, are lined with a highly reflective material, such as aluminum foil. The reflective liner, shown generally at 22 in FIG. 1, prevents radiometric energy emitted by the structural elements comprising chamber 10 or the structural environment surrounding chamber 10 from entering interior 20 of chamber 10. In addition, reflective liner 22 assists in directing radiometric energy emitted within chamber 10 out of the chamber in a manner to be explained hereinafter.

Access to interior 20 of chamber 10 is provided by conventional doors (not shown) which are, like the remainder of chamber 10, lined on their interior surfaces with a reflective material such as aluminum foil.

An opening 26 is provided in ceiling 14 of the chamber. Opening 26 is, in the embodiment shown, located in one corner of ceiling 14 and is approximately 8 feet square, thus covering approximately one quarter of the surface area of ceiling 14. Provided over opening 26 are doors (not shown) which, when closed, completely cover the opening. The interior surfaces of these doors are also lined with aluminum foil. Chamber 10 is arranged such that its interior 20 is open to the sky through opening 26. Hence, the sky, which under most atmospheric conditions is relatively cool (approximately 35° to 70° kelvin) at radiometric frequencies, functions as a heat sink for chamber 10.

Included within chamber 10 as an important part of the complete simulator in a sloping reflecting surface, shown generally at 64. Reflecting surface 64 is located generally directly beneath opening 26, and for a chamber having the dimensions described above, begins at a point 66 on a line on floor 12 connecting opposite corners of chamber 10, approximately 12 feet from one corner 67 thereof.

Reflecting surface 64 is flat, generally rectangular, and slopes upwardly from point 66 to adjoining walls 17 and 18. Edges 68 and 70 of reflecting surface 64 thus run from point 66, substantially at right angles to each other, to walls 17 and 18. The other two edges 69 and 71 of the reflecting surface 64 mate with walls 17 and 18 along their entire length and intersect each other at corner 67 of the chamber. In the embodiment shown, reflecting surface 64 is at a 45° angle to the horizontal, and is located directly under opening 26, so that any energy directed horizontally toward reflecting surface 64 will, after striking surface 64, be directed vertically out to the sky through opening 26.

An upright panel 73 connects edge 70 and floor 12, while another similar upright panel (not shown) connects edge 68 and floor 12. Reflecting surface 64 and the upright panels are all lined with reflective foil, like the other interior surfaces of chamber 10.

Also provided in the simulator are a rain shield, shown generally at 30, and a sun shield, shown generally at 32, for use in proximity to opening 26. Rain shield 30 is adapted to fit over opening 26, and prevents rain from entering chamber 10. It comprises a frame 34 of reflective metal, such as aluminum, and relatively thin, rectangular panels 36a, 36b of clear plastic. Plastic panels are generally preferable to clear glass because of its lower emissivity at radiometric frequencies.

Rain shield 30 is arranged so that it slopes upwardly from two opposing sides of opening 26 towards the middle thereof. Two upright triangular-shaped inserts 37a, 37b form the respective ends of rain shield 30, and completely close off opening 26. This arrangement prevents rain from collecting on rain shield 30, which would result in the sky appearing to be heavily occluded, causing a significant increase in the radiometric energy level of the interior of the chamber.

Sun shield 32 comprises two flat, rectangular panels 39a, 39b which are joined together at right angles. Sun shield 30 is arranged upright adjacent two adjoining sides of opening 26 relative to the path of the sun that a shadow is cast across a portion of, or all of, opening 26 during operation of the simulator, thereby preventing the sun from shining directly into interior 20 of chamber 10. Direct sunlight has been found to cause an increase in the radiometric energy level of interior 20 of chamber 10.

The configuration of chamber 10, including reflective liner 22, opening 26 and reflecting surface 64 combine to provide a cold, i.e. low energy, background in chamber 10 at radiometric frequencies. The background energy level is usually substantially lower than the background radiometric energy levels found in real world applications. A low level background is very important to the operation of the present simulator, as it is desirable, for accurate evaluation of the operation of a given radiometric guidance system, that only the radiometric energy produced by the energy array simulating the terrestial scene stimulate the sensor located in chamber 10. A "low level background" hence means a level which does not distort the radiometric information received by the sensor from the energy array.

Figure 2:
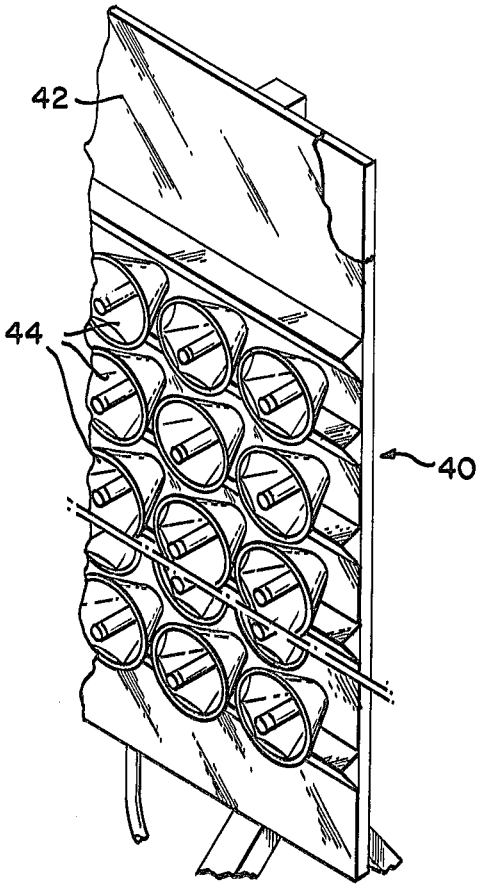
FIG. 2 is a perspective view of a portion of the radiometric array of the simulation facility of FIG. 1.

The radiometric signature of a particular terrestial scene, i.e. the total radiometric emissions of the terrain, monuments, etc. of a particular physical area, is provided by an energy array shown generally at 40 in FIG. 1. A portion of energy array 40 is shown in more detail in FIG. 2. Energy array 40 comprises a vertical panel 42, on one vertical surface of which is arranged a closely positioned plurality of noise sources 44—44 which are individually controlled.

In operation, noise sources 44—44 produce radiation over a desired range of radiometric frequencies which includes not only frequencies of current interest, i.e. 35 and 94 gHz, but also the other frequencies in the radiometric range as well. The intensity or magnitude of the noise produced by each noise source 44—44 is controllable, and hence, energy array 40 is capable as a unit of simulating an actual terrestial scene in radiometric energy terms, including simulating the changing radiometric appearance of terrain and/or a target as it would appear to a moving aircraft.

The resolution of energy array 40, and hence the dynamic capability of the simulation facility, depends upon the number of individual noise sources 44 which are encompassed within the immediate field of view of the guidance sensor positioned in chamber 10. In the embodiment shown and described herein, energy array 40 includes eight horizontal rows of twelve noise sources, for a total of ninety-six noise sources. However, it should be understood that a much larger number of noise sources can be used, resulting in a significantly more sophisticated device having a substantially higher resolution. It is anticipated that an energy array comprising 1200 noise sources will be sufficient to dynamically test the most sophisticated radiometric guidance systems.

A particular terrestial scene in the real world comprises a number of surfaces, such as for instance, actual terrain, objects, and/or monuments. Each surface has a defined radiometric temperature, equal to its emissivity times its temperature, as measured by a thermometer, plus its reflectivity times the temperature of the particular surface which it is reflecting. The particular surface in most instances is the sky.

Metals and similar materials which are highly reflective generally are much cooler in radiometric temperature terms than, for instance, terrain or similar surfaces, which are highly emissive. Energy array 40 thus simulates the real-world radiometric signature of a terrestial scene by varying the intensity of the radiation produced by individual noise sources 44—44.

An area of relatively low energy intensity, produced by selected noise sources in energy array 40, thus simulates the radiometric appearance of more reflective surface in the real world, while an area of high energy intensity simulates the radiometric appearance of a more emissive surface in the real world. A total particular terrestial scene is thus simulated by individually controlling the energy level of each noise source 44 in energy array 40, so that the entire array 40 appears radiometrically to a sensor as if it actually were a particular portion of a real-world scene.

The scene may be quickly changed by changing the intensity level of each noise source, thereby simulating a change in the radiometric appearance of the real-world scene, as it might appear to a sensor on board a flying aircraft or missile on its way to a target.

Referring now to FIG. 3, one of the noise sources 44 comprising energy array 40 is shown in detail. Noise source 44 basically comprises a light element 50, which is a non-coherent source of millimeter waves, and a collimator 52.

In the embodiment shown, light element 50 is a small, elongated fluorescent tube light which is commercially available and relatively inexpensive. One such fluorescent light is manufactured by General Electric and is sold under the number F4T5. This light is approximately 5 inches long, approximately ½ inch in diameter, and emits radiation over a frequency range of approximately 2 gHz to more than 100 gHz. The light emits non-coherent radiation in all directions, although a majority of the radiation will be emitted at substantially right angles to the longitudinal dimension of the light. Although the embodiment shown uses a relatively inexpensive fluorescent light as light element 50, there are special purpose noise sources available which would operate satisfactorily. Such noise sources are expensive and hence economically impractical.

Light element 50 is supported along the central axis 49 of collimator 52, which is generally funnel-shaped in configuration. The conical surface portion 53 of collimator 52 is approximately 35° removed from the collimator's central axis, and gradually narrows from a free front edge 54 to a rear tubular portion 55 which clamps light element 50 in place. Light element 50 is thus held by collimator 52 such that it projects along central axis 49 from tubular portion 55 out to a point which is approximately co-planar with free front edge 54.

The function of collimator 52 is to align the electromagnetic radiation produced by light element 50 into parallel waves and direct them to a target. The collimator angle, i.e. the angle between conical surface 53 and the imaginary central axis, of 35° was chosen because the resulting structure provides fairly good parallel alignment for the radiation produced by light element 50, but does not result in radiation being reflected back into light element 50, which would be the case for the theoretically optimum collimator angle of 45°.

In the embodiment shown, free front edge 54 of collimator 52 is scalloped, as shown in FIG. 3, in six equal sections, thus permitting the noise sources 44—44 comprising energy array 40 to be placed on 2-inch centers, even though the diameter of the collimator at its free front edge may be somewhat larger. This configuration permits noise sources 44—44 to be tightly packed together with minimum loss of space.

Initially, the total radiometric energy input to the sensor from the array 40 will be a function of numerous factors, including the intensity of the radiation produced by each light element 50 in energy array 40, the spacing of the light elements in the array, the distance between the array and the sensor, the collimation of the radiation from the array, and system scaling factors, among others. These factors are then adjusted until the appearance of the array is an accurate simulation of a real-world scene.

Once the operating physical parameters of the simulator are established, however, a variation in the current to selected light elements will result in a corresponding change in the scene presentation observed by the sensor, and will appear to the simulator system as an actual valid change in the real-world scene. Accurate control of the current provided to each light thus permits precise scene presentation control for sophisticated scene presentations, in which a high resolution scene changes rapidly through automatic control by virtue of a computer or similar device.

The light element used in the embodiment shown and described requires a substantial amount of time for initial plasma formation. In order to substantially shorten this "warm-up" time, a quiescent current of approximately 12 ma is provided to each light element during operation of array 40. This quiescent current results in the production of a low level of radiation at by noise sources 44—44, which in turn is substantially all reflected out of chamber 10 to the sky by reflecting surface 64.

The light element used in the embodiment shown has a response time of approximately 40 microseconds, for change in its radiometric energy output (as opposed to its visual energy output) in response to a change in input current. Forty microseconds is fast enough to simulate changes in the real-world scene at current speeds of aircraft and missiles.

The light element provides a stable radiometric energy output up to ⅝ of its maximum rated current, which is 119 ma. In operation of the present invention, the current to each light element is varied between 15 ma and 75 ma, which, under conventional test conditions, is sufficient to vary the radiometric appearance of the scene presented by the array over a wide enough range to provide accurate simulation of the radiometric appearance of a real-world scene.

When the simulator of the present invention is used to evaluate the performance of a particular guidance system, conventional guidance system evaluation hardware and techniques are utilized in combination with the simulator. A conventional three-axis flight table 60 will typically be positioned across from array 40, generally in the center of reflecting surface 64. Mounted on flight table 60 is a sensor 62, which is set up to receive a portion of the radiation produced by array 40.

Generally, sensor 62 has a relatively narrow field of view so that it is responsive to radiation from only a selected few of the noise sources 44—44 at one instant of time. This results in a high resolution view of the real-world scene simulated by the array 40. The remainder of the radiation produced by array 40 is reflected by reflecting surface 64 out of chamber 10 to the sky, resulting in the radiometric background in the chamber being maintained at a desirably low level. The scene presentation developed by array 40 is thus undistorted by background energy in chamber 10.

To assist in providing the low radiometric energy background, array 40 is positioned relative to reflecting surface 64 and sensor 62 and to the interior surfaces of chamber 10 such that energy striking reflecting surface 64 directly from array 40 is reflected directly vertically through opening 26 to the sky. For this reason, reflecting surface 64 is arranged directly beneath opening 26 and is set at a 45° angle to the general direction of the radiation from array 40. All interior surfaces of chamber 10 are preferably, but not necessarily, arranged non-parallel with the line-of-sight direction between array 40 and sensor 62. This arrangement assists in the reflection of radiation out of chamber 10, and further prevents any energy from being reflected back into array 40.

It is generally desirable that as much radiation as possible (other than that captured by sensor 62) be directed out of chamber 10 and that as much as possible of that radiation be directed vertically or so close to vertical as possible. This results in a minimum reflection back into chamber 10 and results in a background energy level which is desirably low.

The simulator shown generally in FIG. 1 and described above is utilized to dynamically test and evaluate the operation of passive guidance and navigation systems which use radiometric frequency energy emitted by a terrestial scene from guidance information. The simulator is capable of testing radiometric guidance systems which use various steering techniques, among them being: (1) contrast terminal homing, in which the system senses the contrast being adjacent portions of a scene in order to recognize and home on a particular target; (2) correlation terminal housing, in which the system recognizes particular landmarks by comparing the radiometric signatures of the landmarks within its view with the stored signature of the object which it is homing on; and (3) correlation positional update, in which the system continuously controls the flight of the aircraft or missile by observation of the terrain and comparing it with a stored route. It should be understood, however, that the present simulator is capable of testing and evaluating guidance systems which use steering techniques other than those described specifically above.

Referring now to FIG. 4, a simplified block diagram of a complete system suitable for testing, evaluation and development of radiometric guidance systems is shown. In an actual test situation, a portion of the radiation produced by array 40 is received by sensor 62 and then applied to the guidance system avionics 65 under test. Guidance system 65 then generates commands which in a real-world application would be used to actually steer the aircraft or missile. For simulator purposes, however, these commands are applied to a scene control device 72, which controls the scene presentation produced by array 40 by controlling the current to each noise source comprising the array.

Scene control 72 receives the commands generated by the guidance system, and alters the scene presentation from array 40 accordingly, if necessary, making it appear to sensor 62 that an aircraft steering correction, either to home on a particular target, or remain on a specified course, has occurred. Scene control 72 may be a programmed computer, since a computer will have the necessary speed to change the current levels to array 40 fast enough for a real-time evaluation of a flight of an aircraft or missile. The signals from scene control 72 may be applied to a switching matrix 74, which distributes the signals to the individual noise sources 44.

This process of scene adjustment in response to commands from the guidance system under test continues until the test flight is terminated. The commands of the guidance system 65 under test are usually continuously displayed on a recording and display apparatus 76 for inspection and performance evaluation.

It should be understood that scene control 72, switching matrix 74 and recording and display apparatus 76 are all portions of known simulator systems used for testing various guidance systems, and are conventional in design and construction. They do not form a part of the present invention, which concerns a simulator capable of simulating a real-world operating environment for passive guidance and navigation systems using radiometric frequencies for its guidance information.

Hence, a simulator has been shown and described which is capable of simulating the radiometric appearance of a terrestial scene in a relatively cold radiometric environment. The simulator is suitable for use as part of a total system for testing, evaluating and developing guidance and navigation systems using radiometric frequencies.

Although an exemplary embodiment of the invention has been disclosed herein for purpose of illustration, it should be understood that the various changes, modifications and substitutions may be incorporated in such embodiment without departing from the spirit of the invention, as defined by the claims which follow.

What is claimed is:

1. A simulator for use in the dynamic testing of guidance systems which use radiometric frequency energy emitted by the components of a terrestial scene for guidance information, the simulator comprising:
   a chamber, wherein said chamber (1) has interior surfaces which have a low emissity at radiometric frequencies, and (2) includes an opening to a heat sink capable of receiving radiometric frequency energy from said chamber, so that a low background level of radiometric frequency energy is maintained in said chamber;

an array of radiometric energy means located in said chamber for producing in operation a variable-intensity pattern of radiometric frequency energy, said pattern simulating the pattern of radiometric frequency energy produced by the components of a particular terrestial scene, wherein in simulator operation, the radiometric frequency energy produced by said array is directed toward a sensor located in said chamber; and a low-emissity reflecting surface means located in said chamber in such a manner that said surface means reflects a substantial portion of the radiometric frequency energy produced by said array not otherwise captured by the sensor out of said chamber through said opening.

2. An apparatus of claim 1, wherein said opening is in the ceiling of said chamber, and opens said chamber to the sky.

3. An apparatus of claim 2, wherein said interior surfaces includes vertical interior surfaces which surround said array and the sensor and wherein (1) the vertical interior surfaces of said chamber are so arranged relative to each other and (2) wherein said array and the sensor are located within said chamber in such a manner that none of said vertical interior surfaces is parallel with the line-of-sight between said array and the sensor.

4. An apparatus of claim 3, wherein said chamber includes a rainshield positioned over said opening to prevent rain from entering said chamber, said rainshield being configured and arranged so as to prevent rain from collecting thereon.

5. An apparatus of claim 3, wherein said reflecting surface is positioned at approximately 45° from the horizontal, substantially directly under said opening.

6. An apparatus of claim 3, wherein each radiometric energy means comprises an elongated, relatively small diameter, source of radiometric frequency energy and a collimator for collecting the radiometric energy produced by said source and directing it in a particular direction.

7. An apparatus of claim 6, wherein said source of radiometric frequency energy is a fluorescent lamp.

8. An apparatus of claim 6, wherein said collimator is funnel-shaped, having a large free end, a small free end, and a central axis extending therebetween, wherein said source of radiometric frequency energy is aligned substantially along the central axis of said collimator, and extends to substantially the large free end of said collimator.

9. An apparatus of claim 8, wherein the collimator includes a first conical sectional which extends from said large free end a selected distance toward said small free end, and wherein the first conical section has an angle of approximately 35° from the central axis of the collimator.

* * * * *

UNITED STATES PATENT AND TRADEMARK OFFICE
CERTIFICATE OF CORRECTION

PATENT NO. : 4,106,345

DATED : August 15, 1978

INVENTOR(S) : Saunders, et al

It is certified that error appears in the above—identified patent and that said Letters Patent are hereby corrected as shown below:

Assignee: The Boeing Company, Seattle, Washington

Attorneys: Cole, Jensen & Puntigam P.S.

Signed and Sealed this

Twenty-fourth Day of July 1979

[SEAL]

Attest:

Attesting Officer

LUTRELLE F. PARKER

Acting Commissioner of Patents and Trademarks